(12) United States Patent
Althaus

(10) Patent No.: US 6,493,121 B1
(45) Date of Patent: Dec. 10, 2002

(54) BIDIRECTIONAL MODULE FOR MULTICHANNEL USE

(75) Inventor: Hans-Ludwig Althaus, Lappersdorf (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/702,026

(22) Filed: Oct. 30, 2000

Related U.S. Application Data

(63) Continuation of application No. PCT/DE99/01262, filed on Apr. 29, 1999.

(30) Foreign Application Priority Data

Apr. 30, 1998 (DE) .......................................... 198 19 533

(51) Int. Cl.$^7$ ................................................ H04B 10/00
(52) U.S. Cl. ...................................... 359/152; 359/163
(58) Field of Search ................................ 359/152, 159, 359/163, 173, 131

(56) References Cited

U.S. PATENT DOCUMENTS

| | | | | |
|---|---|---|---|---|
| 4,262,362 A | * | 4/1981 | Kiernan et al. | 359/114 |
| 4,767,171 A | * | 8/1988 | Keil et al. | 359/114 |
| 5,127,075 A | * | 6/1992 | Althaus et al. | 385/94 |
| 5,347,605 A | * | 9/1994 | Isaksson | 385/92 |
| 5,416,624 A | | 5/1995 | Karstensen | 359/114 |
| 5,552,918 A | * | 9/1996 | Krug et al. | 359/152 |
| 5,566,265 A | * | 10/1996 | Spaeth et al. | 385/93 |
| 5,621,573 A | * | 4/1997 | Lewis et al. | 359/634 |
| 5,663,821 A | * | 9/1997 | Suda et al. | 359/152 |
| 5,841,562 A | * | 11/1998 | Rangwala et al. | 359/152 |
| 6,040,934 A | * | 3/2000 | Ogusu et al. | 359/152 |
| 6,075,635 A | * | 6/2000 | Butrie et al. | 359/159 |
| 6,097,521 A | * | 8/2000 | Althaus et al. | 359/143 |
| 6,154,297 A | * | 11/2000 | Javitt et al. | 359/152 |

FOREIGN PATENT DOCUMENTS

| | | |
|---|---|---|
| EP | 0 463 214 A1 | 1/1992 |
| EP | 0 487 391 A1 | 5/1992 |
| EP | 0 568 851 A3 | 11/1993 |
| EP | 0 644 668 A1 | 3/1995 |
| EP | 0 644 669 A1 | 3/1995 |
| EP | 0 664 585 A1 | 7/1995 |
| EP | 0 836 105 A1 | 4/1998 |
| EP | 0 890 858 A1 | 1/1999 |

* cited by examiner

Primary Examiner—Kinfe-Michael Negash
(74) Attorney, Agent, or Firm—Laurence A. Greenberg; Werner H. Stemer; Ralph E. Locher

(57) ABSTRACT

A compact bidirectional module for multichannel use includes at least one transmitter and at least one receiver combined in a transmission/reception unit installed in a common housing, and at least one further such transmission/reception unit or at least one additional transmission unit or one additional reception unit provided in the common housing. In one preferred embodiment of the present invention, the transmission/reception unit is constructed in accordance with a bidirectional transceiver module which is described in German Published, Non-Prosecuted Patent Application DE 93 120 733 A1 and is also referred to as a TO-BIDI module, and additional transmission or reception units are likewise constructed by using the TO construction. Thus, a compact module that combines the assemblies of the known BIDI module and those of the TO-BIDI module, with their characteristics is provided.

20 Claims, 8 Drawing Sheets

BIDIRECTIONAL MODULE FOR MULTICHANNEL USE

CROSS-REFERENCE TO RELATED APPLICATION

This application is a continuation of copending International Application No. PCT/DE99/01262, filed Apr. 29, 1999, which designated the United States.

BACKGROUND OF THE INVENTION

Field of the Invention

The invention relates to a transmission and reception module for bidirectional optical message and signal transmission, in which a fiber connection for an optical fiber and lens coupling optics are disposed in a common housing. Such modules include a first optical unit, which contains a transmitter, is disposed on the longitudinal axis of the housing defined by the fiber axis. Such modules include at least one beam splitter disposed at an oblique angle to the longitudinal axis, and on the longitudinal axis, in the interior of the housing. By means of the beam splitter, it is possible to deflect beams of light radiation from and to at least one corresponding further optical unit. These optical units disposed to the side of the longitudinal axis. For many years, fiber-optic message transmission used transmission of at least one channel in each case, bidirectionally, using the full-duplex or half-duplex method. By way of example, European Patent Application 0 463 214 A1 discloses a transmission and reception module, which is known as a BIDI module, for bidirectional optical message and signal transmission. In this module, the two active components (the light transmitter and the light receiver) are installed as autonomous components encapsulated such that they are hermetically sealed in a common module housing. In a hollow interior of the common module housing, a beam splitter and lens coupling optics are disposed. The module also includes a fiber connection for a common optical fiber. The transmitter injects an optical signal into the attached glass fiber, while another optical signal can be received from the same fiber simultaneously or at a different time. The beam splitter separates the two signals. The beam splitter also may contain a WDM (wavelength division multiplexing) filter, in which one specific wavelength can be reflected, and another can be passed.

If, apart from the respective one channel in each direction, it is intended to transmit a further channel in at least one direction, then an external fiber splitter or an external WDM filter can be installed in the supplying glass fiber. This glass fiber can be located upstream of the module. However, this represents a relatively impracticable solution.

On the other hand, a so-called multichannel transceiver module is proposed in German Published, Non-Prosecuted Patent Application DE 93 114 859 A1. In this application, at least one further light transmitter and/or light receiver with associated lens coupling optics and at least one further beam splitter are provided in the common housing of a conventional BIDI module as described above. The further light transmitter or transmitters and/or light receiver or receivers is or are designed preferably in the form of the so-called TO (transistor outline) standard construction. TO standard construction has been described in German Published, Non-Prosecuted Patent Application DE 93 120 733 A1. However, this solution has the disadvantage that bidirectional transmission of a further channel requires two TO modules, namely a transmission module and a reception module, in the common housing.

European Patent Application 0 644 668 A1 discloses a transmission and reception module for bidirectional optical multichannel transmission having a light transmitter, a light receiver, a fiber connection for a common optical fiber, lens coupling optics, and a beam splitter. The beam splitter is positioned at an intermediate point in the beam path, and is disposed in a common housing. At least one further light transmitter and/or light receiver, with associated lens coupling optics, and at least one further beam splitter are provided in the common housing. In the illustrated exemplary embodiments, the beam splitters are disposed one behind the other in the beam path, and parallel to one another, inclined at an angle of 45° to the beam path, between the fiber connection and the opposite light transmitter, in the axial direction of the optical fibers in the housing.

European Patent Application 0 487 391 A1 relates to an optical bidirectional transmission and reception module having a common fiber connection opening, a plurality of transmitters, a plurality of receivers, and a corresponding plurality of light paths. Beam splitters are in each case disposed upstream of the transmitters and receivers in two mutually parallel levels. The object of this arrangement of beam splitters is to allow light at a wavelength corresponding to the respective transmitter or receiver to pass, and to reflect light at all other wavelengths.

A compact bidirectional transmission and reception device is disclosed in U.S. Pat. No. 5,416,624. The compact bidirectional transmission and reception device has a planar convex lens with a beam-splitting wavelength filter disposed on its planar surface. This lens is positioned between a transmitter and a receiver. This arrangement produces a compact transmission and reception device. In addition, in FIG. 4, this document shows a linear array of such lenses, by means of which radiation beams from such a linear arrangement of transmitters can be injected into a linear arrangement of optical fibers.

SUMMARY OF THE INVENTION

Accordingly, the object of the present invention is to specify a transmission and reception module having a multichannel capability for bidirectional optical message and signal transmission. This reception module also is designed to save space and expand by adding further bidirectional channels in as simple a manner as possible.

With the foregoing and other objects in view, there is provided, in accordance with the invention, a transmission and reception module for bidirectional optical message and signal transmission. This module features a common housing forming an opening and containing lens coupling optics and a fiber connection for an optical fiber with a longitudinal axis. The module also includes a first optical unit containing a transmitter disposed along the longitudinal axis. In addition, the modules includes a second optical unit adjacent the longitudinal axis, at least one of said first optical unit and said second optical unit being a combined transmission/reception unit having a unit housing at least partially surrounding a transmitter and a receiver, the unit housing mounted in said opening in said common housing. The module further includes a beam splitter in said common housing disposed on the longitudinal axis and at an oblique angle thereto. The beam splitter deflects beams of light radiation between said first optical unit and said second optical unit.

The invention described further below with reference to exemplary embodiments achieves this object in a compact module in which at least one transmitter and at least one receiver are combined in a transmission/reception unit. This unit is installed in the common housing. Furthermore, at least one additional such transmission/reception unit or at least one transmission unit or one reception unit are provided in the common housing.

In one preferred embodiment of the present invention, the transmission/reception unit is designed in accordance with a bidirectional transceiver module which is described in German Published, Non-Prosecuted Patent Application DE 93 120 733 A1 and is also referred to as a TO-BIDI module. Furthermore, the at least one transmission unit or the at least one reception unit is preferably designed as a TO module. The invention thus describes a compact module that combines the assemblies of the known BIDI module and those of the TO-BIDI module with their characteristics.

The multichannel BIDI thereby produced can transmit one channel, or more than one channel, in the respective directions simultaneously, in addition to the normal bidirectional function on two bidirectional channels.

A conventional BIDI module having two bidirectional channels, that is to say one transmission channel and one reception channel, thus becomes a module with three channels by the use of a TO transmission or reception module by means of a TO-BIDI having the same external dimensions. If one TO transmission module is replaced by a TO-BIDI, one transmission and reception channel and a second reception channel result. If one TO reception module is replaced by a TO-BIDI, the configuration produces two transmission channels and one reception channel. Finally, if a TO laser and TO receiver are each replaced by TO-BIDIs, then the configuration produces two transmission and two reception channels: i.e., four channels. This can, of course, also be expanded to the module arrangement having three TO components, resulting in modules with five and six channels. The corresponding expansion to even more channels can be achieved by appropriate lengthening of the module by simultaneous outputting by means of additional filters in the optical beam path to the corresponding additional TO components. In optical terms, this can be done in a particularly simple manner by designing the optics of the TO components for one collimated beam in the module. The maximum possible number of channels is thus twice as great as the number of connected TO-BIDIs, or is correspondingly less if a single TO transmission or reception component is used instead of a TO-BIDI.

A further major advantage of the arrangement according to the invention is that the optical channel separations in the TO-BIDI and BIDI module can be of a different type or of the same type. If, for example, a WDM filter is used for virtually no-loss separation of two wavelengths in the module, then not only can the separation in the TO-BIDI be accomplished in the same way once again, using a WDM filter to two further wavelengths. However, a 3 dB-beam splitter can also be used to split the intensity of one wavelength between, in each case, one reception channel and one transmission channel.

This means that the use of TO-BIDIs as TO components allows the multichannel BIDI to operate each individual channel bidirectionally. This is true particularly in the case of WDM systems having a number of discrete wavelengths: for example, in accordance with the ITU Standard, four wavelengths or even more. These are so-called HD-WDM systems. In comparison with multichannel HD-WDM systems as normally used until now, and which are operated only unidirectionally, this results in full bidirectional functionality on each WDM channel. This means that, for relatively recent multichannel WDM transmission on individual glass fibers, the arrangement according to the invention allows the transmission capacity of the fibers to be doubled by means of bidirectional operation.

Thus, using the arrangement according to the invention, two bidirectional module types with different optics are combined such that a new module type is produced. The functional characteristics of this new module are considerably better than the intrinsic functions of the individual module types. Thus, using the arrangement according to the invention, it is not just possible to produce any desired multichannel modules, but also to operate one-directional multichannel HD-WDM transmission systems fully bidirectionally. The wavelength stabilization which is required, for example by means of temperature stabilization, can in this case be accomplished by appropriate temperature stabilization of the entire module, as described, for example, in German Published, Non-Prosecuted Patent Application DE 93 114 860 A1.

In accordance with another feature of the invention, the combined transmission/reception unit includes a combined mirror/beam-splitter layer equally reflecting a radiation beam emitted from the transmitter and transmitting a received radiation beam that is to be detected by the receiver.

In accordance with another feature of the invention, the transmission/reception module further includes a common substrate supporting the lens coupling optics and the transmitter. The transmitter is a laser chip having a light output side opposing a substrate part mounted on the common substrate. The common substrate holds the combined mirror/beam-splitter layer. The combined mirror/beam-splitter layer inclines at an angle of approximately forty-five degrees (45°) to the light output side of the laser chip such that a radiation beam which is emitted by the light output side is reflected on the combined mirror/beam-splitter layer toward the lens coupling optics. The substrate part and the common substrate transmit a wavelength of the received radiation beam to be detected by the receiver, and the light receiver located on the outlet side of the received radiation beam from the common substrate.

In accordance with another feature of the invention, the beam splitter can contain a selective-wavelength filter.

In accordance with another feature of the invention, the transmission/reception unit further includes a common substrate having a bottom face and a substrate part. The substrate part having a side surface with a mirror layer. The transmission/reception unit also includes a laser chip below the optical coupling having a resonator surface emitting a radiation and. The laser chip is disposed as a transmitter with the side surface adjacent the resonator surface. The resonator surface inclines at an angle of approximately forty-five degrees (~45°) to the side surface so the radiation is directed upwards perpendicularly from the common substrate to the lens coupling optics. The lens coupling optics attaches to the substrate part such that the mirror layer is adjacent the resonator surface. The beam splitter reflects the radiation emitted from the laser chip and passing radiation injected from the lens coupling optics such that the light receiver is provided underneath the beam splitter, on the bottom face of the common substrate.

In accordance with another feature of the invention, the transmission/reception module can include a reception unit; a transmission unit; a further transmission/reception unit; two reception units; a reception unit and a further transmission/reception unit; four reception units; four transmission units; and/or four further transmission/reception units.

In accordance with another feature of the invention, the transmission/reception module can include 2n further transmission/reception units, where n is an integer greater than or equal to 2.

Although the invention is illustrated and described herein as embodied in a bidirectional module for multichannel use, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
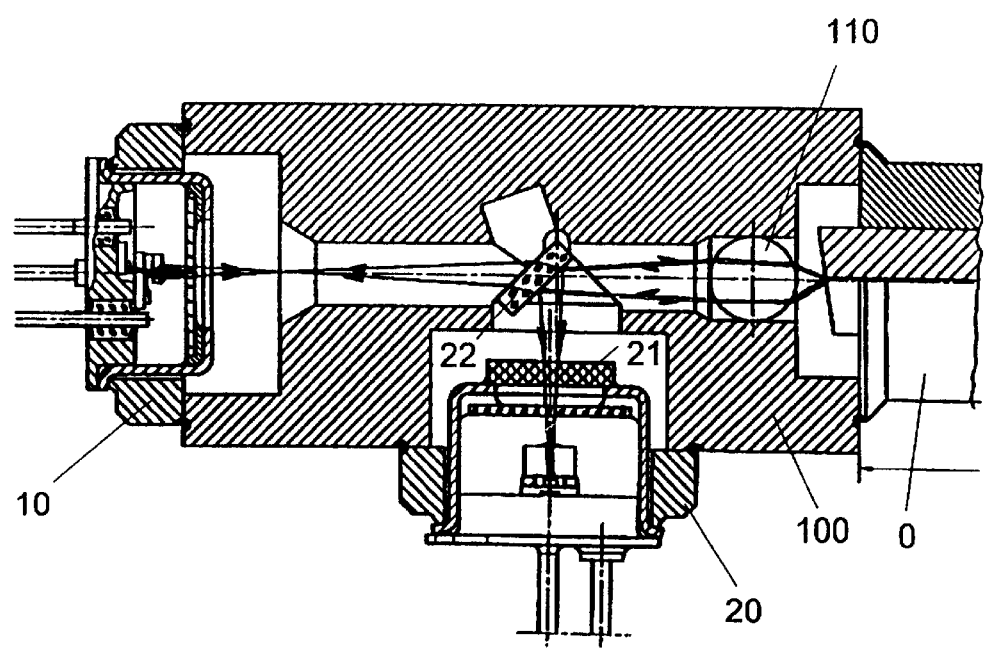
FIG. 1 is a plan view of a basic embodiment of a multichannel BIDI.

Referring now to the figures of the drawings in detail and first, particularly, to FIG. 1 thereof, there is seen a basic embodiment of the present invention. The basic version of a multichannel BIDI is formed from the common housing body 100, two (2) subcomponents 10 and 20 and the common SM (single mode) connecting fiber 0. The lens coupling optic 110 for the common optical fiber 0 is disposed in the vicinity of the end of the optical fiber 0 in the form of a spherical lens, although this may also be omitted if the overall coupling optics are appropriately designed. The subcomponent 10, which is fitted on the module axis, is a transmission/reception unit that contains a transmitter and a receiver. This transmission/reception unit may, for example, be a TO-BIDI module as mentioned above. That is to say, it may be a bidirectional transmission/reception unit produced using the standard TO construction mentioned above and as described in German Patent Application No. 931 20 733.6. Such a bidirectional transmission/reception unit has a full bidirectional function for a reception channel A, for example for 1480 nm, and a transmission channel, for example for 1300 nm. The subcomponent 20 is installed in the common housing 100. The subcomponent 20 is a TO-PIN diode in the illustrated exemplary embodiment. That is to say, a diode receiver is likewise produced using the standard TO construction mentioned above, for a further reception channel B that, for example, is set to a wavelength of 1550 nm. The fully selective-wavelength channel separation with an efficiency greater than ninety-five percent (>95%) in each case is carried out for the further reception channel B using an appropriate WDM filter. The WDM filter is contained in the beam splitter 22, on the beam axis, using conventional BIDI technology. A stop filter 21 can also be placed upstream of the TO housing of the subcomponent 20, in order to mask out undesirable wavelengths.

The corresponding channel separation for the transmission channel and the reception channel A within the subcomponent 10 can be provided using the known TO-BIDI technology. An example of this technology is described in German Patent Application No. 931 20 733.6, mentioned above.

Figure 5:
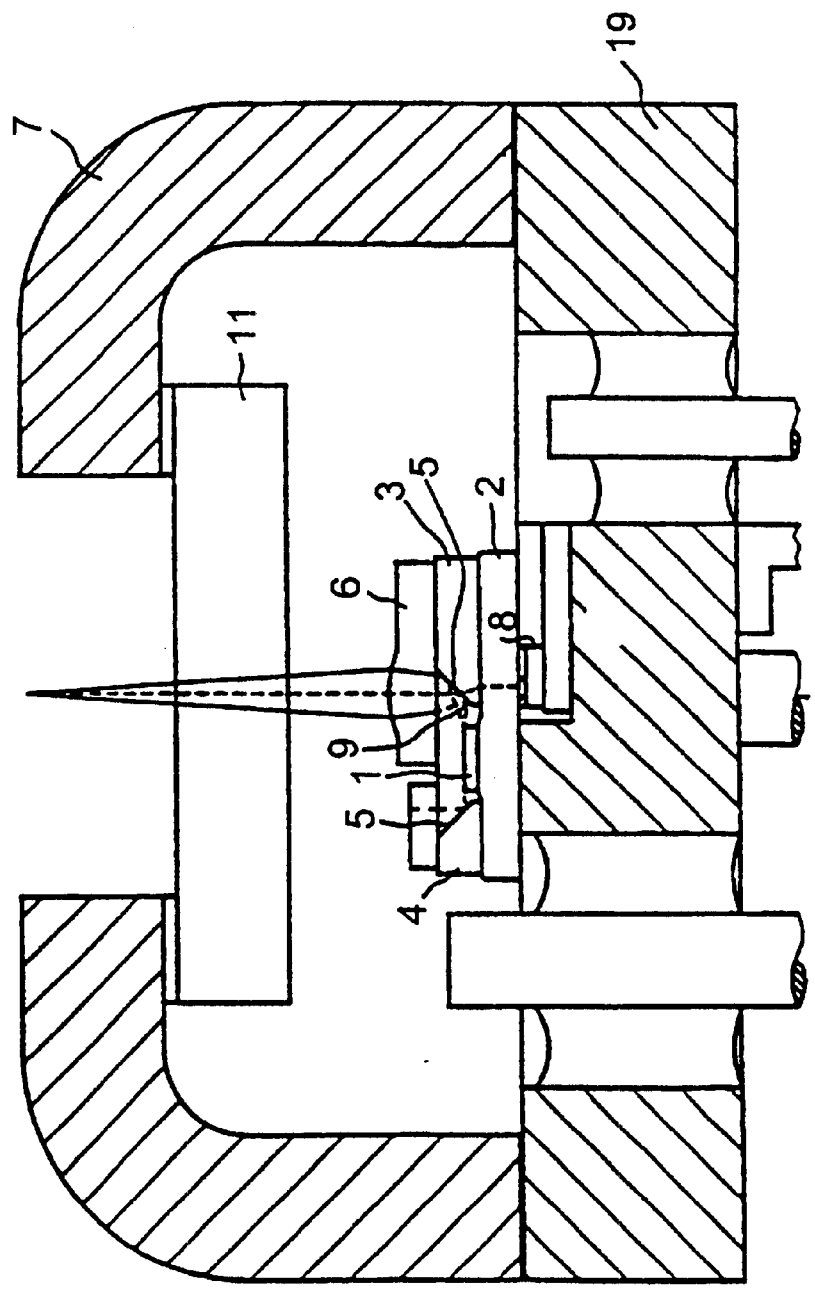
FIG. 5 is f plan view of a transmission/reception unit in the form of a TO-BIDI.

The essential elements of this construction will be described once again here, with reference to FIG. 5 in order to assist understanding. FIG. 5 shows a bidirectional transmission and reception module using TO construction (TO-BIDI module) that can be used as the subcomponent 10. The transmission and reception module essentially includes a laser chip 1, which has lens coupling optics 6, as a light transmitter, a light receiver 8, and a beam splitter 9 disposed at an intermediate point in the beam path. In addition, the beam splitter 9 is at least partially surrounded by a housing 7 onto which a light inlet and outlet window 11 is glazed. The laser chip 1 is disposed on a common substrate 2 composed of silicon. The common substrate can be a submount mounted, for example, on a baseplate 19 of a TO housing. The laser chip 1 is disposed on the common substrate between two substrate parts 3, 4. The side surfaces of the two substrate parts 3,4 are adjacent the optical resonator surfaces of the laser chip 1, are provided with mirror layers 5, and are inclined at an angle of approximately forty-five degrees (45°) to the resonator surfaces. This angle of inclination provides that the coherent radiation emitted from the laser chip 1 is deflected upwards, virtually at right angles to the surface of the common substrate 2, as a divergent light beam onto the lens coupling optics 6, which are disposed above the laser chip 1. The two substrate parts 3, 4 are preferably composed of glass or (like the substrate 2) of silicon, and have a trapezoidal profile. The lens coupling optics 6 are disposed and mounted on at least one substrate part, in this exemplary embodiment on the substrate part 3, such that the radiation emitted from the laser chip 1 strikes it virtually at right angles.

The mirror layer 5 is adjacent the front face of the laser chip 1. The mirror layer 5 is provided with a beam splitter 9 that reflects the radiation emitted from the laser chip 1 and passes the radiation injected from the exterior via the lens coupling optics 6. The light receiver 8 or an optical coupling for the light receiver 8 is provided underneath the beam splitter 9, on the bottom face of the common substrate 2.

The beam splitter 9 forms an optical separating device for different light wavelengths or for the same light wavelengths. A separation of greater than ninety-five percent (>95%) can be achieved for different light wavelengths in the transmission path and reception path, that is to say when the beam splitter is operated on a selective-wavelength basis. Fifty percent (50%) separation, for example, or some other separation, can be set if the wavelength in the two paths is the same. In order to achieve bidirectional transmission, only the mirror layer 5, which is adjacent the front face of the laser chip 1 and is mounted on the substrate part 3, need be provided with a filter layer as a beam splitter 9. The beam splitter 9 reflects the laser light at a wavelength emitted from the laser and passes the light at a different wavelength that is incident from the exterior. Silicon is transparent to light at a wavelength of more than 1.1 µm. Silicon is also sufficient to fit a suitable light receiver 8 or a suitable optical coupling for an external light receiver at the point where the light emerges on the bottom face of the common substrate 2. The substrate is preferably composed of silicon.

Such a TO-BIDI module, which is described in FIG. 5, may be used in the transmission/reception module according to the invention as the transmission/reception unit or as the subcomponent 10 as shown in FIG. 1. However, any other conceivable configuration of a transmission/reception unit may also be used as the subcomponent 10.

The beam splitter 22 also may separate the reception channel B without any wavelength selectivity. In this case, it would be expedient to use an approximately 5 dB beam splitter as the beam splitter 22 in the main beam path. Such a beam splitter extracts approximately thirty percent (~30%) for the subcomponent 20 and passes sixty percent (60%) which is then split, for example, with 3 dB in the TO-BIDI module 10.

For the module arrangement according to the invention and as shown in FIG. 1, this results in the following first possible directional operating condition range for three (3) transmission channels:

1a.) If three (3) wavelengths are used (for example 1300 nm, 1480 nm, and 1550 nm), full-duplex operation on three (3) channels with greater than ninety-five percent (>95%) efficiency for the individual channels and >35 dB channel separation.

1b.) If two (2) wavelengths are used (for example 1300 nm and 1550 nm), full-duplex operation on one reception channel and one transmission channel with greater than ninety-five percent (>95%) efficiency and >50 dB channel separation for the reception channel (for example at 1550 nm), and half-duplex operation in each case for the second reception channel and the transmission channel, in each case at an efficiency of, for example, approximately fifty percent (~50%) (for example at 1300 nm).

1c.) If one (1) a wavelength is used (for example 1300 nm, or 1550 nm), half-duplex operation on all three (3) channels (for example two (2) reception channels and one (1) transmission channel), for example at an efficiency of approximately thirty percent (~30%), distributed uniformly between all the channels, or with the capability to split this in any other ratio.

The second range of application or operation options for three (3) channels is provided in the arrangement according to the invention if the TO component disposed at the side of the module body is a TO laser instead of a TO-PIN diode, and whose emission characteristic is matched to the module optics. The options may be derived in a corresponding manner from 1a), b), c).

The third range of application and operating options for even four (4) channels is obtained in the arrangement according to the invention and as shown in FIG. 1 if both the TO components disposed on the module housing (on the side and on the axis) are TO-BIDIs. In this embodiment, two (2) double channels are then respectively separated by one beam splitter on the optical beam axis and one beam splitter in each of the TO-BIDIs. The variation options can in this case once again be derived analogously to the pattern specified above, expanded by one channel. The option of full-duplex transmission on four (4) channels (for example 1280 nm, 1380 nm, 1480 nm, and 1560 nm) should be stressed in particular in this case.

Figure 2A:
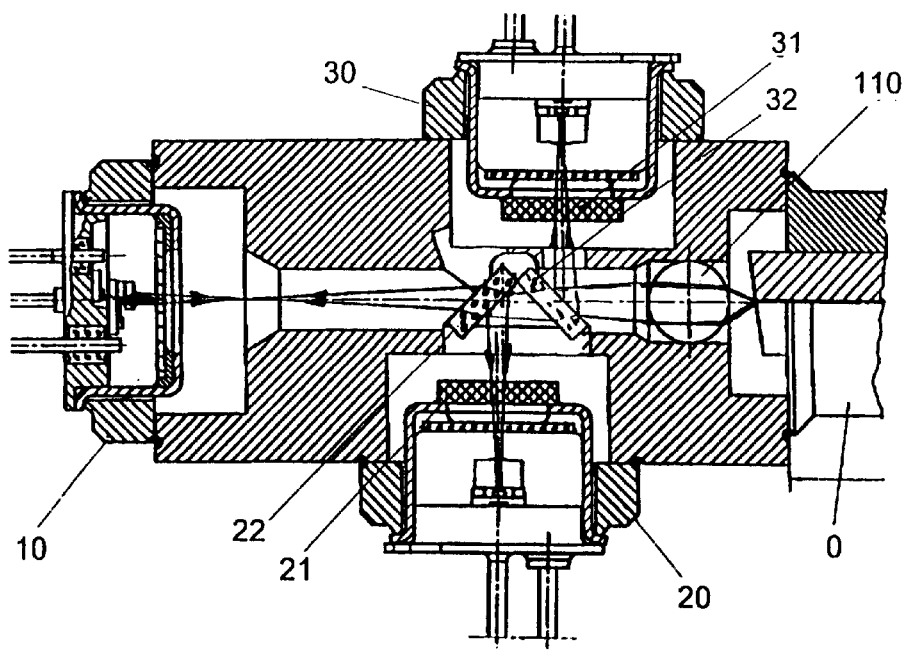
FIG. 2a is a plan view of a multichannel BIDI with three TO components wherein both of the subcomponents are TO receivers.
Figure 2B:
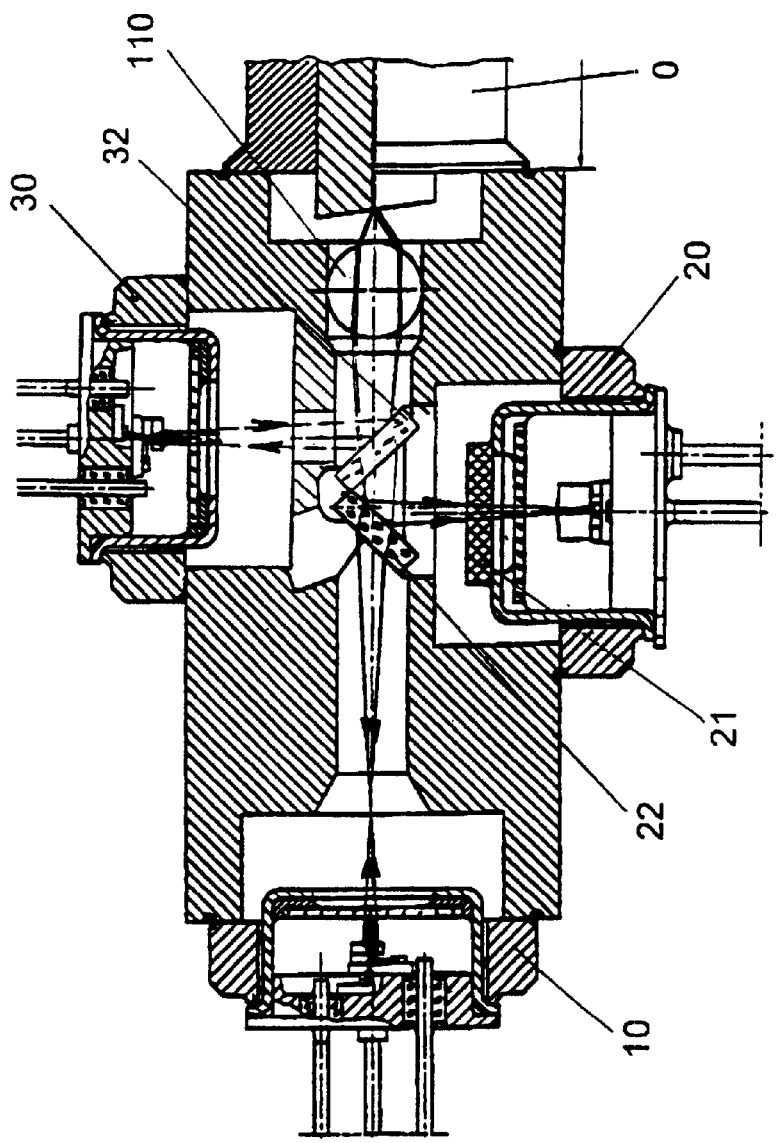
FIG. 2b is a plan view of a multichannel BIDI with three TO components herein both of the subcomponents are TO receivers.

FIGS. 2a and 2b show further exemplary embodiments of the arrangement according to the invention having three (3) TO components 10, 20 and 30 and an SM connecting fiber 0 on the common module housing. The TO component 10 is a TO-BIDI, and the two (2) other TO components 20 and 30 are either TO lasers and/or TO-PIN diodes or else TO-BIDIs. The additional beam splitter 32 allows at least a portion of the radiation coming from the connecting fiber 0 to be deflected in the direction of the TO component 30. This beam splitter may also contain a selective-wavelength filter. The range of operating and application options described with reference to FIG. 1 thus results in 3 to 6 possible transmission channels.

In FIG. 2a, both the subcomponents 20 and 30 are TO receivers. Stop filters 21 and 32 can be connected upstream of the TO housings of both subcomponents.

In FIG. 2b, the two subcomponents 10 and 30 are illustrated as TO-BIDIs.

Figure 3A:
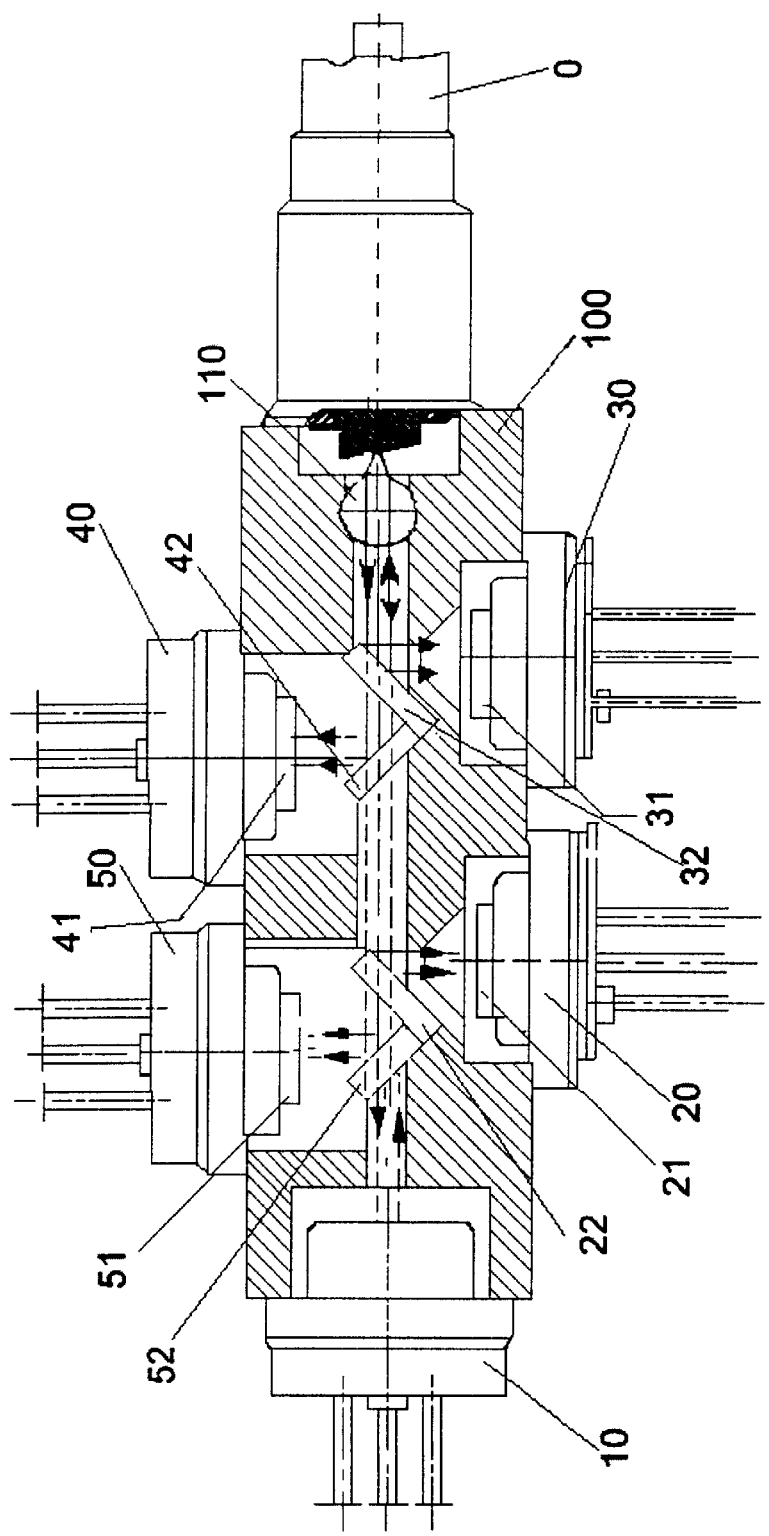
FIG. 3a is a plan view of a multichannel BIDI with five TO components wherein four TO receivers are disposed at the side and one TO-BIDI is disposed in the axial direction.

FIGS. 3a, b, c show exemplary embodiments of the arrangement according to the invention with five (5) TO components 10, 20, 30, 40, and 50 and one (1) SM connecting fiber 0 on the common module housing 100. The beam splitters 42 and 52 produce at least partial beam deflection in the direction of the subcomponents 40 and 50. At least one of the TO components is a TO-BIDI or, in the same sense any desired variants of transmitters, receivers or TO-BIDIs. This thus results in an overall maximum of ten (10) bidirectional transmission channels if fully equipped with TO-BIDIs. The following variants should be stressed as being particularly important in this version:

I) In the first variant, four (4) TO receivers are disposed at the side and one (1) TO-BIDI is disposed in the axial direction. In this case, for example, the HDWDM filters, matched to the ITU grid, can separate the four (4) reception channels in the 1550 nm window, and the module can thus receive four (4) channels. The TO-BIDI, disposed in the axial direction, can in this case operate the monitoring channel in the 1300 nm window, or bidirectionally at 1480 nm (FIG. 3a).

Figure 3B:
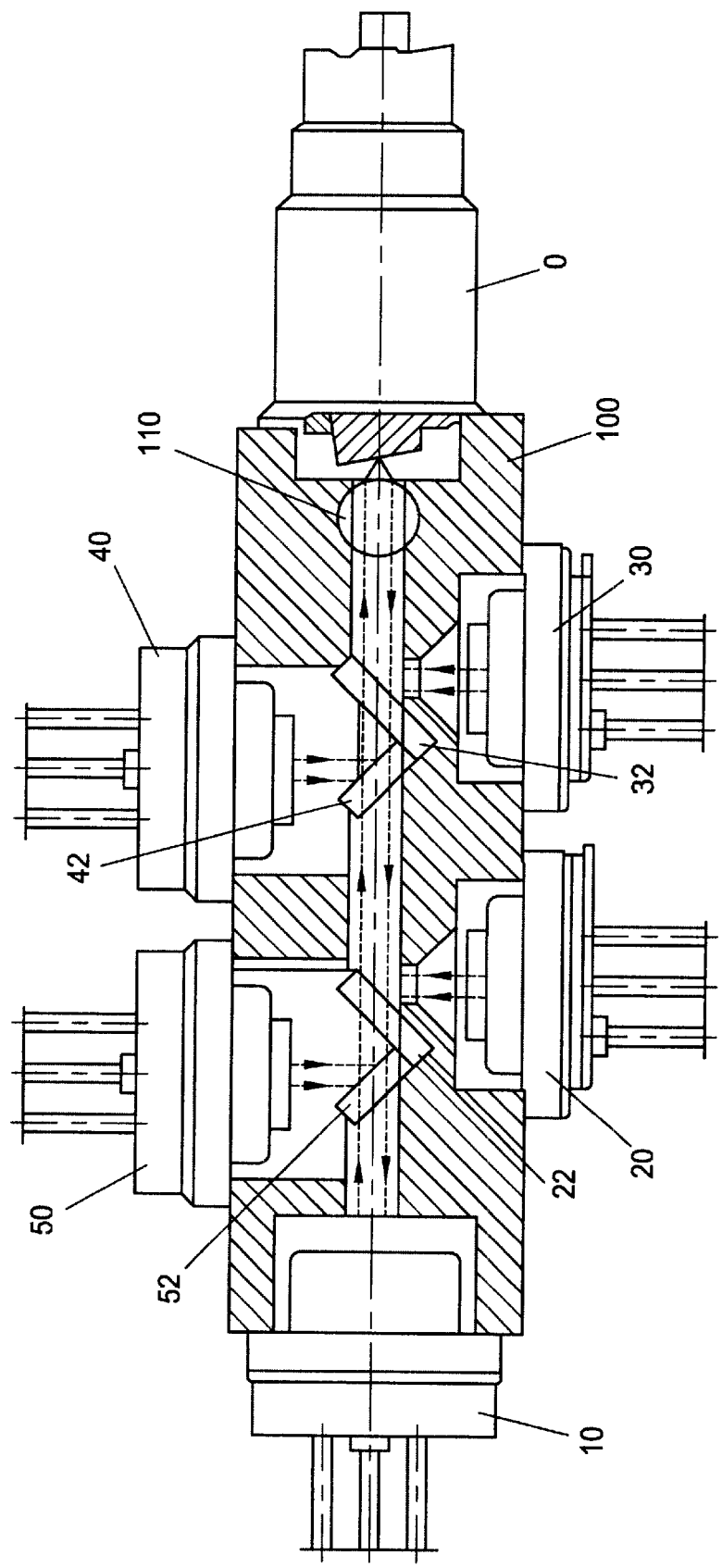
FIG. 3b is a plan view of a multichannel BIDI with five TO components wherein four TO transmitters are disposed at the side, and one TO-BIDI is disposed in the axial direction as a corresponding HDWDM transmitter.

II) In the second variant, four (4) TO transmitters are disposed at the side, and one (1) TO-BIDI is disposed in the axial direction as a corresponding HDWDM transmitter, as the inverse of I. See FIG. 3b.

Figure 3C:
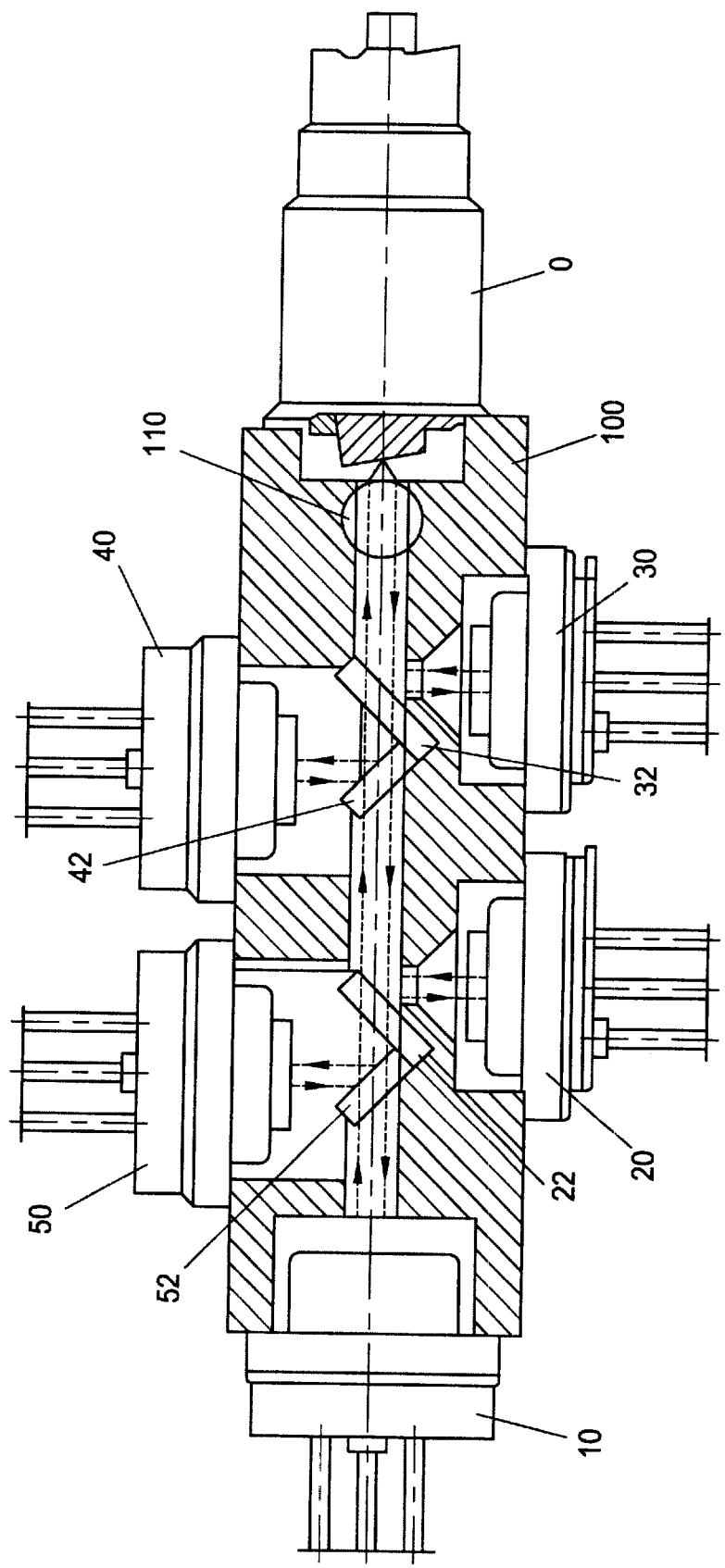
FIG. 3c is a plan view of a multichannel BIDI with five TO components wherein four TO-BIDIs are disposed at the side and one TO-BIDI is disposed in the axial direction for the monitoring channel.

III) In the third variant, four (4) TO-BIDIs are disposed at the side and one (1) TO-BIDI is disposed in the axial direction for the monitoring channel, as a fully bidirectional HDWDM multichannel transmission/reception component using the ITU grid. See FIG. 3c.

Figure 4:
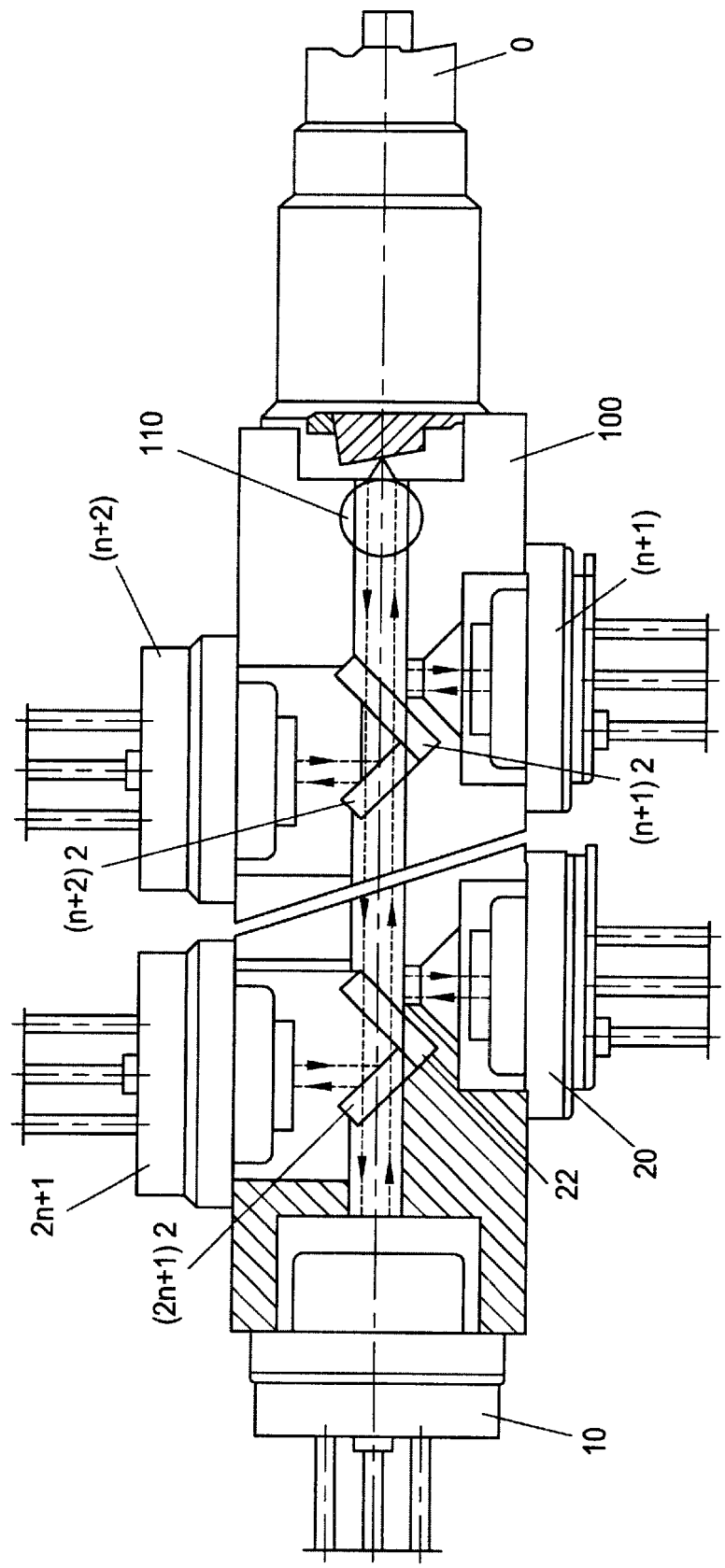
FIG. 4 is a plan view of a multichannel BIDI with n TO-BIDIs.

FIG. 4 shows the option according to the invention for expanding the "bidirectional multichannel module" with n TO components for n≧2 to a worthwhile n to 2n channels by alternate addition of further TO components, each with matched optics. A collimated beam on the optical module axis is particularly worthwhile in this case. According to the invention, the TO components may be TO-BIDIs, TO lasers or, TO-PIN diodes. The range of combinations is once again evident from the above description in this case.

The variant illustrated in FIG. 4, in which all the TO components are TO-BIDIs should be stressed in particular here. In this case, it is possible to use, for example, an HDWDM channel allocation in accordance with the ITU Standard of, for example, eight (8) or more channels in the full-duplex or half-duplex mode.

I claim:

1. A transmission and reception module for bidirectional optical message and signal transmission, comprising:
   a common housing forming an opening and containing lens coupling optics and a fiber connection for an optical fiber with a longitudinal axis;
   a first optical unit containing a transmitter disposed along the longitudinal axis;
   a second optical unit disposed adjacent the longitudinal axis, at least one of said first optical unit and said second optical unit being a combined transmission/reception unit having a unit housing at least partially surrounding a transmitter and a receiver, the unit housing mounted in said opening in said common housing; and
   a beam splitter in said common housing disposed on the longitudinal axis and at an oblique angle thereto, said beam splitter deflecting beams of light radiation from and to said second optical unit.

2. The transmission and reception module according to claim 1, wherein said combined transmission/reception unit includes a combined mirror/beam-splitter layer equally reflecting a radiation beam emitted from said transmitter and transmitting a received radiation beam to be detected by said receiver.

3. The transmission/reception module according to claim 2, further comprising:
   a common substrate supporting said lens coupling optics and said transmitter, said transmitter being a laser chip having a light output side opposing a substrate part mounted on said common substrate, said common substrate holding said combined mirror/beam-splitter layer, said combined mirror/beam-splitter layer inclining at an angle of approximately 45° to said light output side of said laser chip, such that a radiation beam emitted by said light output side is reflected on said combined mirror/beam-splitter layer toward said lens coupling optics; and
   said substrate part and said common substrate transmitting a wavelength of the received radiation beam to be detected by the receiver, and said light receiver located on said outlet side of the received radiation beam from said common substrate.

4. The transmission/reception module according to claim 1, wherein said beam splitter contains a selective-wavelength filter.

5. The transmission/reception module according to claim 1, wherein said transmission/reception unit further includes:
   a common substrate having a bottom face and a substrate part, said substrate part having a side surface with a mirror layer;
   a laser chip below said optical coupling having a resonator surface emitting a radiation and, said laser chip disposed as a transmitter with said side surface adjacent said resonator surface, said resonator surfaces inclined at an angle of approximately forty-five degrees to said side surface for directing said radiation upwards perpendicularly from said common substrate to said lens coupling optics, said lens coupling optics attached to said substrate part, such that said mirror layer is adjacent said resonator surface; said beam splitter reflecting the radiation emitted from said laser chip and passing radiation injected from said lens coupling optics such that said light receiver is provided underneath the beam splitter, on said bottom face of said common substrate.

6. The transmission/reception module according to claim 1, further comprising:
   a reception unit.

7. The transmission/reception module according to claim 1, further comprising:
   a transmission unit.

8. The transmission/reception module according to claim 1, further comprising:
   a further transmission/reception unit.

9. The transmission/reception module according to claim 1, further comprising:
   two reception units.

10. The transmission/reception module according to claim 1, further comprising:
    a reception unit; and
    a further transmission/reception unit.

11. The Transmission/reception module according to claim 1, further comprising:
    four reception units.

12. The transmission/reception module according to claim 1, further comprising:
    four transmission units.

13. The transmission/reception module according to claim 1, further comprising:
    four further transmission/reception units.

14. The transmission/reception module according to claim 1, further comprising:
    2n further transmission/reception units, where $n \geq 2$.

15. A transmission and reception module for bidirectional optical message and signal transmission, comprising:
    a common housing forming at least two openings and containing lens coupling optics and a fiber connection for an optical fiber with a longitudinal axis;
    a first optical unit containing a transmitter disposed along the longitudinal axis being mounted in one of said at least two openings in said common housing;
    a second optical unit adjacent the longitudinal axis containing at least one of a transmitter and a receiver, at least one of said first optical unit and said second optical unit being a combined transmission/reception unit integrated in a common unit housing, said common unit housing being mounted in one of said at least two openings in said common housing; and
    a beam splitter in said common housing disposed on the longitudinal axis and at an oblique angle thereto, said beam splitter deflecting beams of light radiation from and to said second optical unit.

16. The transmission/reception module according to claim 15, wherein said transmission/reception unit further includes:
    a common substrate having a bottom face and a substrate part, said substrate part having a side surface with a mirror layer;
    a laser chip below said optical coupling having a resonator surface emitting a radiation and, said laser chip disposed as a transmitter with said side surface adjacent said resonator surface, said resonator surfaces inclined at an angle of approximately forty-five degrees to said side surface for directing said radiation upwards perpendicularly from said common substrate to said lens coupling optics, said lens coupling optics attached to said substrate part, such that said mirror layer is adjacent said resonator surface; said beam splitter reflecting the radiation emitted from said laser chip and passing radiation injected from said lens coupling optics such that an optical coupling for the light receiver is provided underneath the beam splitter, on said bottom face of said common substrate.

17. The transmission and reception module according to claim 16, wherein said combined transmission/reception unit includes a combined mirror/beam-splitter layer equally reflecting a radiation beam emitted from said transmitter and transmitting a received radiation beam to be detected by said receiver.

18. The transmission/reception module according to claim 17, further comprising:
   a common substrate supporting said lens coupling optics and said transmitter, said transmitter being a laser chip having a light output side opposing a substrate part mounted on said common substrate, said common substrate holding said combined mirror/beam-splitter layer, said combined mirror/beam-splitter layer inclining at an angle of approximately 45° to said light output side of said laser chip, such that a radiation beam emitted by said light output side is reflected on said combined mirror/beam-splitter layer toward said lens coupling optics; and said substrate part and said common substrate transmitting a wavelength of the received radiation beam to be detected by the receiver, and an optical coupling for said light receiver located on said outlet side of the received radiation beam from said common substrate.

19. The transmission/reception module according to claim 15, wherein said beam splitter contains a selective-wavelength filter.

20. The transmission/reception module according to claim 15, further comprising a reception unit.

\* \* \* \* \*